United States Patent Office 2,948,296
Patented Aug. 9, 1960

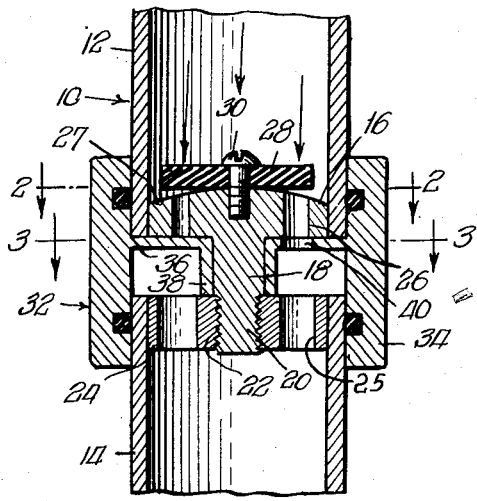

2,948,296

VARIABLE CONSTANT FLOW DEVICE

David H. Thorburn, Oak Park, Ill., assignor to The Powers Regulator Company, Skokie, Ill., a corporation of Illinois Filed Mar. 24, 1958, Ser. No. 723,334

7 Claims. (Cl. 137—517)

This invention pertains to a valve and in particular to a valve for maintaining a predetermined constant rate of flow of fluid irrespective of wide variations in the fluid pressure.

Numerous constant flow devices have been developed and disclosed in the prior art; however, the prior art devices generally have a fixed capacity. As a result, it is necessary to have a plurality of the prior art valves of various capacities on hand if it should be desired to change, from time to time, the capacity of the particular system in which the valve was installed. The fact that it is necessary to have a plurality of the valves on hand results in an undesirable duplication of expense. Furthermore, such changes are generally expensive as well as cumbersome, since it is necessary to shut down the system for a period of time in order to substitute one valve for the other. Therefore it is an object of the invention to provide a constant flow valve having a variable capacity.

Another object of the invention is to provide a constant flow valve in which the capacity of the valve may be readily varied.

A still further object of the invention is to provide a constant flow valve of simple and economical construction.

A still further object of the invention is to provide a constant flow valve of an improved construction.

These and other objects will be apparent upon reading of the specification with reference to the drawing.

In the drawing:

Figure 1 is a sectional view of one modification of the valve embodying the invention;

Figure 2 is a sectional view taken along the lines 2—2 in Figure 1;

Figure 3 is a sectional view taken along the line 3—3 in Figure 1;

Figure 4 is a cross-sectional view of the second modification of the valve embodying the invention; and Figure 5 is a sectional view taken along the lines 5—5 in Figure 4.

Referring now to Figure 1 there is shown one form of the valve, generally denoted by the numeral 10, embodying the invention. The valve 10 is comprised of a tubular upstream section 12 and a tubular downstream section 14 co-operating to form a casing. The tubular members 12 and 14 may be of any suitable type preferably cylindrical and may even be part of the conduit through which the fluid flows.

A valve seat member 16 is disposed within the tubular member 12 and is in touching, preferably sealing relationship, with the walls of the tubular member. The valve seat member 16 is provided with a downwardly extending shank 18 having a threaded portion 20. The threaded portion 20 is received within a complementary threaded bore 22 of the disk 24. The disk 24 is disposed within the tubular section 14 and is in touching, preferably sealing, engagement with the walls of the tubular section. The disk 24 is provided with a series of apertures 25 which are of sufficient total size to permit substantially unrestricted flow of the fluid.

In the preferred embodiment either the valve seat member 16 or the disk 24 is slidable relative to its associated tubular section with the other being fixed in its associated tubular section. In this manner the construction as shown in Figure 1 provides an expansible construction which permits elongation or contraction of the conduit system in which the valve is mounted.

The valve seat member 16 is provided with a plurality of orifices 26 annularly spaced as shown in Figure 2. The orifices 26 vary in size in this particular construction, although it is possible to construct all of them of the same size as will be seen later on. The upper surface 27 of the valve seat member 16 has a domelike cross-section as is best shown in Figure 1. Secured to the upstream side of the valve seat member 16 along its center line is a resilient disk 28, by means of the screw 30. The resilient disk 28 is constructed of some resilient material such as rubber, plastic, or the like. The disk 28 is radially spaced from the wall of the tubular section 12 and is longitudinally spaced from the orifices 26. The periphery of the disk 28, however, overlies all of the orifices 26 so that any fluid flowing through the valve must flow around the edge of the disk through the particular orifice being used, as will be seen later on.

By constructing the disk 28 of a resilient material the pressure of the fluid flowing through the valve will force the edges of the disk 28 downwardly toward engagement with the domelike surface 27 of the valve seat member 16. As the pressure increases, the disk 28 is deflected farther downward, as indicated by the dotted lines, so as to provide a greater restriction to the fluid attempting to flow through the orifices. The greater restriction counterbalances the increased pressure so that the amount of fluid passing through the valve is maintained substantially constant. On the other hand, if the pressure is decreased, the longitudinal space will increase so that there is a lesser restriction to flow. In this manner it is possible to maintain a predetermined rate of flow regardless of wide fluctuations in pressure in the system in which the valve is located.

Intermediate the two tubular sections 12 and 14 is a selector members, generally denoted by the numeral 32. The selector member 32 includes an annular member 34 which receives and is in sealing engagement with the ends of the tubular members 12 and 14 as shown in Figure 1. An annular flange 36 extends radially inwardly from the ring 34 and is provided with the sleevelike apertured member 38. The apertured member 38 extends between the valve seat member 16 and the disk 24 and serves to position the ring 34 with respect to the ends of the tubular members 12 and 14.

The aperture member 38 is rotatably mounted on the shank 18 and permits the ring 34 to rotate about the tubular members 12 and 14. As best shown in Figure 3, the annular flange 36 is provided with at least one passage 40. The passage 40 is adapted to be selectively aligned with one of the orifices 26 and is of the same size or larger than the largest orifice in the valve seat member 16. If it is necessary to have a relatively low constant rate of flow, then the passage 40 is aligned with one of the smaller orifices such as that indicated by the numeral 42. On the other hand, if it is necessary to have a relatively high constant rate of flow, then it is necessary to align the passage 40 with one of the larger orifices such as that indicated by the numeral 44. The selective indexing of the passage 40 with the various orifices may be accomplished simply by rotating the ring 34 about the conduits 12 and 14. It may be desirable to provide suitable graduations or indicia about the circumference of one of the tubular members 12 or 14 and a reference marker on the ring 34 so as to facilitate the alignment of the passage 40 with a desired orifice.

Referring now to Figures 4 and 5, there is shown a modified form of the invention generally denoted by the numeral 50. The modified form of the valve includes a casing 52 provided with the threaded portions 54 and 56 adapted to be received by the complementary threaded portions in the conduit through which the fluid flows.

A valve seat 58 is mounted within the bore 60 of the casing 52. In its preferred form the valve seat 58 is fixed by the set screw 64 extending through the wall of the casing 52 as best shown in Figure 4. The valve seat 58 on its upstream side 66 has a generally domelike cross-section as shown in the drawings. A plurality of orifices 68 are annularly spaced about the valve seat as best shown in Figure 5. The orifices 68 may be of equal size as shown in the drawing or may be of varying size as disclosed with regard to the first embodiment.

The orifices 68 are provided with the counterbored sections 70 which are all of equal diameter, as will be explained later on. The counterbored portions 70 are internally threaded and are adapted to receive complementary threaded plugs 72 as best shown in Figure 4. The purpose of the plugs 72 is to provide means for selectively blocking one or more of the orifices 68 in order to vary the capacity of the valve. Since the counterbored portions 70 are all of the same size, it is possible to use the same sized plug 72 regardless of the size of the associated orifice.

A resilient disk 74 constructed of some suitable material such as rubber or plastic is secured to the upstream side 66 of the valve seat 58 by the bolt 76. The resilient disk 74 overlies the various orifices in the valve seat 58 and at the same time, as shown in Figure 4, is spaced from the walls of the casing 52 so as to permit longitudinal movement of the outer periphery of the resilient disk 74 due to the pressure of the fluid flowing through the valve 50. Due to the domeshaped construction of the valve seat 58, the resilient disk 74 is normally longitudinally spaced from the surface 66 so that fluid may flow around its periphery, along its underneath side and through the orifices 68. If the pressure of the fluid flowing through the valve 50 increases, the resilient disk 74 is farther deflected a corresponding amount so that the longitudinal space between the surface 66 and the resilient disk 74 is decreased. The decreasing of the longitudinal space causes an increased restriction to the flow of fluid through the valve 50. Thus any variation in pressure is counterbalanced by a corresponding variation in restriction so that the preselected flow rate of the fluid is maintained substantially constant. If it should be necessary to change the constant rate of flow, then one or more of the plugs may be inserted or removed depending on the capacity desired.

From the foregoing description it will be seen that the invention provides a valve for maintaining a constant preselected rate of flow regardless of wide variations in the pressure of the fluid passing through the valve. Moreover, the predetermined constant rate of flow can be varied if desired by selectively blocking or unblocking one or more of the orifices used in the construction of the valve.

It should be pointed out that the various components of the valves may be constructed of any suitable material for constructing valves such as metals or plastics. The components of the valves are simple and economical in construction and may be readily assembled so that the valves are relatively inexpensive and may be used in existing systems without any extensive alteration.

Although two preferred embodiments of my invention have been disclosed, it is to be understood that this is merely by way of example and is in no way to be construed as a limitation. It is contemplated that certain modifications may be made within the scope of the claims without departing from the spirit of the invention.

I claim:

1. A valve for maintaining a constant rate of flow of a fluid regardless of wide variations in the pressure of the fluid comprising a casing, a valve seat in said casing, said valve seat having a plurality of orifices, means for selectively opening at least one of said orifices to vary the capacity of said valve, and a resilient disk mounted on the upstream side of said valve seat, said resilient disk radially overlying said orifices and normally being resiliently spaced from said orifices, to permit flow of fluid around said disk and through at least one of said orifices, at least those portions of said resilient disk overlying said open orifice being deflected downwardly toward said open orifice an amount dependent upon pressure of the fluid passing through said valve so as to decrease the space between said disk and valve seat whereby an increase in pressure is counterbalanced by an increase in restriction so that the flow of the fluid is maintained at the preselected capacity.

2. A valve for maintaining a constant rate of flow of a fluid regardless of wide variations in the pressure of the fluid comprising a casing, a valve seat in said casing, said valve seat having a plurality of annularly spaced orifices, means for selectively blocking said orifices to vary the capacity of said valve, a resilient disk mounted on the upstream side of said valve seat, said resilient disk being spaced from the wall of said casing and overlying said orifices, said resilient disk normally being resiliently spaced from said orifices to permit fluid to flow around the edge of said disk and through said orifices, at least those portions of said resilient disk overlying the open orifices being deflected downwardly toward said orifices an amount dependent upon the pressure of the fluid passing through said valve so as to decrease said space whereby an increase in pressure is counterbalanced by an increase in restriction so that the flow of the fluid is maintained at the preselected capacity.

3. A valve for maintaining a constant rate of flow of a fluid regardless of wide variations in the pressure of the fluid comprising a casing, a valve seat within said casing, a plurality of orifices in said valve seat, means for selectively opening said orifices to vary the capacity of said valve, and a resilient disk being resiliently spaced from said orifices and overlying said orifices, at least those portions of said resilient disk overlying the open orifices being deflected to vary the space between said open orifices and said resilient disk an amount dependent upon the pressure of the fluid.

4. A valve for maintaining a constant rate of flow of a fluid regardless of wide variations in the pressure of the fluid comprising a casing, a valve seat mounted within said casing, a plurality of orifices annularly spaced in said valve seat, means for selectively opening said orifices to vary the capacity of said valve, and a resilient disk secured to the upstream side of said valve seat, said resilient disk overlying said orifices and being resiliently spaced therefrom, at least those portions of said resilient disk overlying the open orifice being deflected downwardly an amount dependent on the pressure of the fluid passing through said valve whereby the longitudinal space is decreased by an increase in pressure so that the pressure drop across said valve is increased and the flow of the fluid through the valve is maintained at the preselected capacity.

5. A valve member for maintaining a constant rate of flow of a fluid regardless of wide variations in the pressure of the fluid comprising a casing, a valve seat mounted within said casing, a plurality of apertures annularly spaced about said valve seat, ring means rotatably mounted on said casing having a radially inwardly extending annular flange, said annular flange having passage means adapted to be selectively aligned with at least one of said apertures to vary the capacity of said valve, and a resilient disk secured to the upstream side of said valve seat, said resilient disk overlying said apertures and being resiliently spaced therefrom, said resilient disk being deflected downwardly an amount dependent on the pressure of the fluid flowing through said valve whereby the space is further decreased by an increase in pressure and as a result the pressure drop across said valve is increased so that the rate of flow of the fluid is maintained at the preselected capacity.

6. A valve member for maintaining a constant rate of flow of a fluid regardless of wide variations in the pressure of the fluid comprising a casing, a valve seat mounted within said casing, a plurality of apertures annularly spaced about said valve seat, ring means rotatably mounted on said casing having a radially inwardly extending annular flange underlying said valve seat, said annular flange having passage means adapted to be selectively aligned with at least one of said apertures to vary the capacity of said valve, said passage means being aligned with at least one of said apertures by rotation of said ring means relative to said casing, and a resilient disk secured to the upstream side of said valve seat, said resilient disk overlying said apertures and being resiliently spaced therefrom to permit the flow of the fluid around its edge along its underneath side and through said apertures, said resilient disk being deflected downwardly an amount dependent upon the pressure of the fluid flowing through the valve whereby the longitudinal space is further decreased by an increase in pressure and the pressure drop across said valve is increased so that the rate of flow of the fluid is maintained at the preselected capacity.

7. A valve for maintaining a constant rate of flow of a fluid regardless of wide variations in the pressure of the fluid comprising a casing, a valve seat in said casing, said valve seat having a plurality of spaced orifices, plug means for selectively blocking said orifices to vary the capacity of said valve, and a resilient disk mounted on the upstream side of said valve seat, said resilient disk overlying and normally being spaced from said orifices, at least those portions of said resilient disk overlying the open orifices being deflected downwardly toward said orifices an amount dependent upon the pressure of the fluid passing through said valve so as to decrease the longitudinal space whereby an increase in pressure is counterbalanced by an increase in restriction so that the flow of the fluid is maintained at the preselected capacity.

References Cited in the file of this patent

UNITED STATES PATENTS

| 1,577,740 | Macomber | Mar. 23, 1926 |
| 1,621,876 | Doerr | Mar. 22, 1927 |
| 2,777,464 | Mosely | Jan. 15, 1957 |

FOREIGN PATENTS

| 204,897 | Australia | Mar. 8, 1956 |